United States Patent
Meng et al.

(10) Patent No.: US 12,165,241 B1
(45) Date of Patent: Dec. 10, 2024

(54) THREE-DIMENSIONAL RECONSTRUCTION METHOD AND DEVICE, AND STORAGE MEDIUM

(71) Applicant: Tencent America LLC, Palo Alto, CA (US)

(72) Inventors: Xiaoxu Meng, Tallahassee, FL (US); Weikai Chen, Palo Alto, CA (US); Bo Yang, Palo Alto, CA (US)

(73) Assignee: Tencent America LLC

( * ) Notice: Subject to any disclaimer, the term of this patent is extended or adjusted under 35 U.S.C. 154(b) by 134 days.

(21) Appl. No.: 17/947,599

(22) Filed: Sep. 19, 2022

(51) Int. Cl.
*G06T 11/00* (2006.01)
*G06T 17/20* (2006.01)

(52) U.S. Cl.
CPC .......... *G06T 11/006* (2013.01); *G06T 17/205* (2013.01)

(58) Field of Classification Search
CPC ............................ G06T 11/006; G06T 17/205
See application file for complete search history.

(56) References Cited

U.S. PATENT DOCUMENTS

| | | | | |
|---|---|---|---|---|
| 2003/0223627 A1* | 12/2003 | Yoshida | ................... | G06T 7/155 382/128 |
| 2015/0029178 A1* | 1/2015 | Claus | ..................... | A61B 6/032 345/419 |
| 2018/0227571 A1* | 8/2018 | Page | ...................... | H04N 23/71 |
| 2018/0330538 A1* | 11/2018 | Petkov | ..................... | G06T 15/06 |
| 2019/0320154 A1* | 10/2019 | Köhle | .................. | H04N 13/204 |
| 2021/0004933 A1* | 1/2021 | Wong | ...................... | G06T 7/174 |

OTHER PUBLICATIONS

Dong et al., PSDF Fusion: Probabilistic Signed Distance Function for On-the-fly 3D Data Fusion and Scene Reconstruction, Computer Vision Foundation (CVF) ECCV 2018, pp. 17 (Year: 2018).*
The World Intellectual Property Organization (WIPO) International Search Report for PCT/US23/64559 Jul. 5, 2022 12 Pages.
Peng Wang et al. "Learning neural implicit surfaces by volume rendering for multi-view reconstruction", 2021, NeurIPS.
Johannes L. Schonberger et al. "Pixelwise view selection for unstructured multi-view stereo", 2016, p. 501-518, European Conference on Computer Vision, Springer.
(Continued)

*Primary Examiner* — Phuc N Doan
(74) *Attorney, Agent, or Firm* — Anova Law Group, PLLC

(57) ABSTRACT

A three-dimensional (3D) reconstruction method is provided. The method includes obtaining a two-dimensional (2D) pixel coordinate of a pixel in a 2D image of an object and a direction of a ray; projecting the 2D pixel coordinate to a 3D space to obtain a plurality of 3D points on the ray; for each 3D point of the plurality of 3D points: predicting a signed distance value for the 3D point; predicting a validity probability for the 3D point; and predicting an intensity value for the 3D point; obtaining a rendering loss based on the predicted signed distance values, the validity probabilities, and the intensity values of the plurality of 3D points to update a 3D reconstruction network; and extracting a 3D model of the object based on the updated 3D reconstruction network.

20 Claims, 6 Drawing Sheets
(4 of 6 Drawing Sheet(s) Filed in Color)

(56) References Cited

OTHER PUBLICATIONS

Weikai Chen et al. "Three-Pole Signed Distance Function for Learning Surfaces with Arbitrary Topologies", 2022, IEEE Conference on Computer Vision and Pattern Recognition.
Amos Gropp et al. "Implicit geometric regularization for learning shapes", 2020, p. 3569-3579, Proceedings of Machine Learning and Systems 2020.
James T. Kajiya et al. "Ray tracing volume densities", 1984, Computer Graphics (SIGGRAPH).
Ben Mildenhall et al. "Nerf: Representing scenes as neural radiance fields for view synthesis", 2020, p. 405-421, European Conference on Computer Vision, Springer.
Julian Chibane et al. "Neural unsigned distance fields for implicit function learning", Dec. 2020, Advances in Neural Information Processing Systems.
F. Bernardini et al. "The ball-pivoting algorithm for surface reconstruction", Oct.-Dec. 1999, vol. 5, No. 4, IEEE Transactions on Visualization and Computer Graphics.
Lior Yariv et al. "Multiview neural surface reconstruction by disentangling geometry and appearance", 2020, Advances in Neural Information Processing Systems.
J. J., Park et al. "DeepSDF: Learning Continuous Signed Distance Functions for Shape Representation" ,2019.

* cited by examiner

THREE-DIMENSIONAL RECONSTRUCTION METHOD AND DEVICE, AND STORAGE MEDIUM

FIELD OF THE TECHNOLOGY

This application relates to the field of computer vision and computer graphics technologies and, specifically, to a three-dimensional reconstruction method, device, and storage medium.

BACKGROUND

Three-dimensional (3D) modeling and reconstruction is a fundamental problem in computer vision and computer graphics. Existing learning-based approaches need a large corpus of 3D data for model training, which requires laborious efforts for data capturing and labeling. Differentiable rendering (DR) provides an alternative of learning 3D shapes directly from two-dimensional (2D) images, without relying on 3D ground truths. However, existing DR techniques based on Signed Distance Function (SDF) are limited to watertight shapes and are not able to reconstruct shapes with open boundaries.

The disclosed methods and systems are directed to solve one or more problems set forth above and other problems.

SUMMARY

Embodiments of the present disclosure introduce a three-dimensional (3D) reconstruction process. In the process, a two-dimensional (2D) pixel coordinate of a pixel in a 2D image of an object and a direction of a ray are obtained. The 2D pixel coordinate is projected to a 3D space to obtain a plurality of 3D points on the ray. For each 3D point of the plurality of 3D points: a signed distance value for the 3D point indicating a signed distance from the 3D point to a mesh surface is predicted. A validity probability for the 3D point indicating a probability that the 3D point has a valid signed distance value is predicted. An intensity value for the 3D point is predicted. Then, a rendering loss is obtained based on the predicted signed distance values, the validity probabilities, and the intensity values of the plurality of 3D points to update a 3D reconstruction network. A 3D model of the object is extracted based on the updated 3D reconstruction network.

One aspect of the present disclosure provides a three-dimensional (3D) reconstruction method. The method includes: obtaining a two-dimensional (2D) pixel coordinate of a pixel in a 2D image of an object and a direction of a ray; projecting the 2D pixel coordinate to a 3D space to obtain a plurality of 3D points on the ray; for each 3D point of the plurality of 3D points: predicting a signed distance value for the 3D point, the signed distance value of the 3D point indicating a signed distance from the 3D point to a mesh surface; predicting a validity probability for the 3D point, the validity probability of the 3D point indicating a probability that the 3D point has a valid signed distance value; and predicting an intensity value for the 3D point; obtaining a rendering loss based on the predicted signed distance values, the validity probabilities, and the intensity values of the plurality of 3D points to update a 3D reconstruction network; and extracting a 3D model of the object based on the updated 3D reconstruction network.

Another aspect of the present disclosure provides a device for three-dimensional (3D) reconstruction, including a memory storing a computer program and a processor. The processor is configure to execute the computer program to: obtain a two-dimensional (2D) pixel coordinate of a pixel in a 2D image of an object and a direction of a ray; project the 2D pixel coordinate to a 3D space to obtain a plurality of 3D points on the ray; for each 3D point of the plurality of 3D points: predict a signed distance value for the 3D point, the signed distance value of the 3D point indicating a signed distance from the 3D point to a mesh surface; predict a validity probability for the 3D point, the validity probability of the 3D point indicating a probability that the 3D point has a valid signed distance value; and predict an intensity value for the 3D point; obtaining a rendering loss based on the predicted signed distance values, the validity probabilities, and the intensity values of the plurality of 3D points to update a 3D reconstruction network; and extracting a 3D model of the object based on the updated 3D reconstruction network.

Another aspect of the present disclosure provides a non-transitory storage medium storing computer instructions. The computer instructions, when executed by a processor, cause the processor to perform: obtaining a two-dimensional (2D) pixel coordinate of a pixel in a 2D image of an object and a direction of a ray; projecting the 2D pixel coordinate to a 3D space to obtain a plurality of 3D points on the ray; for each 3D point of the plurality of 3D points: predicting a signed distance value for the 3D point, the signed distance value of the 3D point indicating a signed distance from the 3D point to a mesh surface; predicting a validity probability for the 3D point, the validity probability of the 3D point indicating a probability that the 3D point has a valid signed distance value; and predicting an intensity value for the 3D point; obtaining a rendering loss based on the predicted signed distance values, the validity probabilities, and the intensity values of the plurality of 3D points to update a 3D reconstruction network; and extracting a 3D model of the object based on the updated 3D reconstruction network.

Other aspects of the present disclosure can be understood by those skilled in the art in light of the description, the claims, and the drawings of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The following describes the technical solutions in the embodiments of the present invention with reference to the accompanying drawings. Wherever possible, the same reference numbers will be used throughout the drawings to refer to the same or like parts. Apparently, the described embodiments are merely some but not all the embodiments of the present invention. Other embodiments obtained by a person skilled in the art based on the embodiments of the present invention without creative efforts shall fall within the protection scope of the present disclosure.

Figure 1:
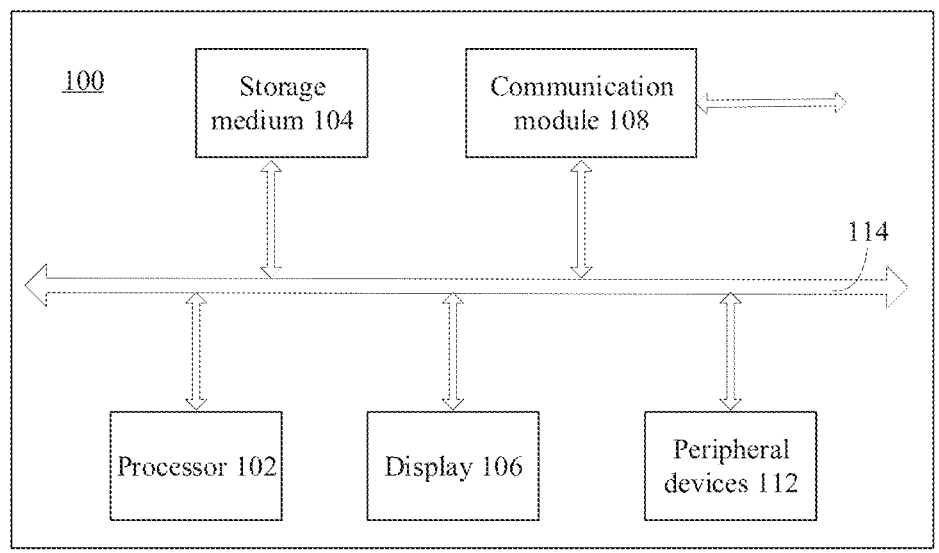
FIG. 1 illustrates a computer system consistent with embodiments of the present disclosure.

FIG. 1 is a block diagram of an exemplary computing system/device capable of implementing the disclosed 3D reconstruction method according to some embodiments of the present disclosure. As shown in FIG. 1, computing system 100 may include a processor 102 and a storage medium 104. According to certain embodiments, the computing system 100 may further include a display 106, a communication module 108, peripheral devices 112, and one or more bus 114 to couple the devices together. Certain devices may be omitted and other devices may be included.

Processor 102 may include any appropriate processor(s). In certain embodiments, processor 102 may include multiple cores for multi-thread or parallel processing, and/or graphics processing unit (GPU). Processor 102 may execute sequences of computer program instructions to perform various processes, such as a 3D reconstruction program, etc. Storage medium 104 may be a non-transitory computer-readable storage medium, and may include memory modules, such as ROM, RAM, flash memory modules, and erasable and rewritable memory, and mass storages, such as CD-ROM, U-disk, and hard disk, etc. Storage medium 104 may store computer programs for implementing various processes, when executed by processor 102. Storage medium 104 may also include one or more databases for storing certain data such as text script, library data, training data set, and certain operations can be performed on the stored data, such as database searching and data retrieving.

The communication module 108 may include network devices for establishing connections through a network. Display 106 may include any appropriate type of computer display device or electronic device display (e.g., CRT or LCD based devices, touch screens). The peripheral devices 112 may include additional I/O devices, such as a keyboard, a mouse, and so on.

In operation, the processor 102 may be configured to execute instructions stored on the storage medium 104 and perform various operations related to a 3D reconstruction method as detailed in the following descriptions. The 3D reconstruction method for one or more objects can be used in any suitable applications that need a 3D model output based on 2D image input. In one example, the 3D reconstruction can be applied in gaming, such as, 3D game object creation and modification, game logic or story plot designing, or virtual representation of the real objects into the game environments. The games can be dress up games, makeover games, home design games, or other suitable games. In another example, the 3D reconstruction can be used in creating/updating character appearance in virtual meetings, dressing up or doing a makeover in online shopping scenarios, etc.

Figure 2:
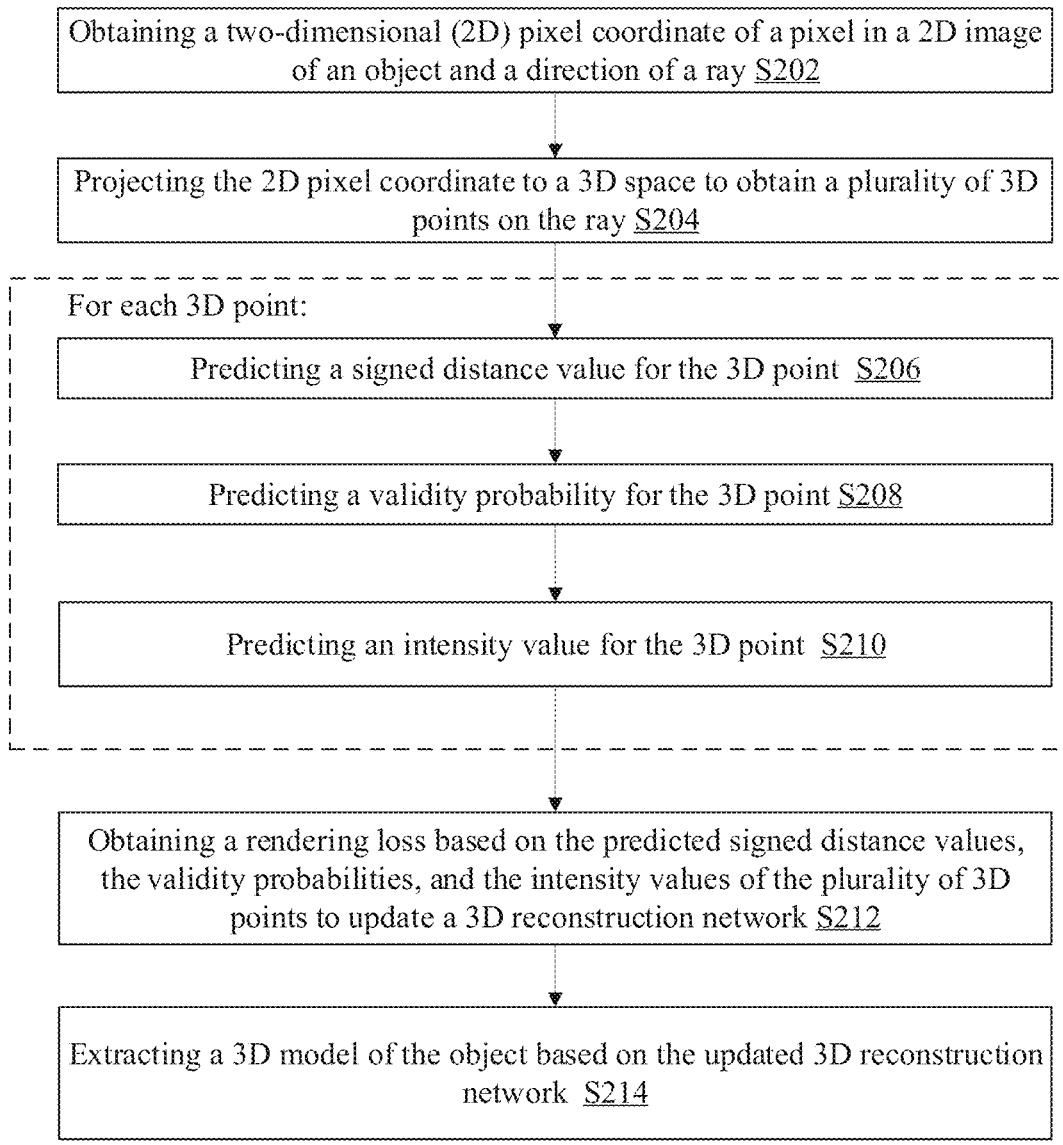
FIG. 2 illustrates a three-dimensional (3D) reconstruction process consistent with embodiments of the present disclosure.
Figure 3:
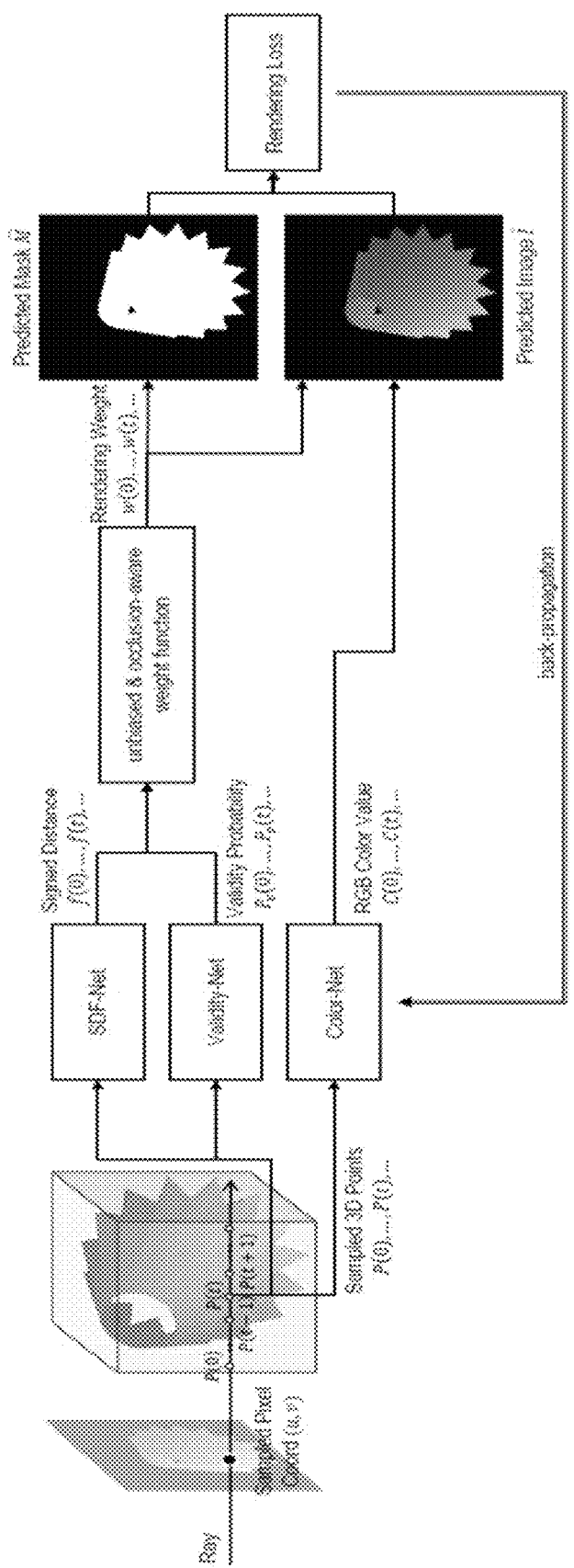
FIG. 3 illustrates a framework of the 3D reconstruction process consistent with embodiments of the present disclosure.

As shown in FIG. 2, the 3D reconstruction method consistent with embodiments of the present disclosure includes following processes. The method can be implemented, for example, by the computing system 100 shown in FIG. 1. FIG. 3 illustrates a framework of the 3D reconstruction process consistent with embodiments of the present disclosure. The method can be implemented in accordance with the framework shown in FIG. 3.

At S202, a two-dimensional (2D) pixel coordinate of a pixel in a 2D image of an object and a direction of a ray are obtained. The 2D image may be, for example, image 302 shown in FIG. 3.

In some embodiments, a plurality of 2D pixel coordinates of a plurality of pixels in the 2D image are obtained. In some embodiments, two or more 2D images of the object corresponding to two or more different directions of the rays are obtained for 3D image reconstruction. The rays here may be understood as camera rays.

In some embodiments, N images $I_{k_{k=1}}^{N}$ with a resolution of (W, H) together with corresponding camera intrinsics, extrinsics, and object masks $M_{k_{k=1}}^{N}$ are obtained to reconstruct the surface of the object. In some embodiments, the object masks are binary images obtained by marking the object for reconstruction with a first value and marking a background of the image with a second value. The object masks may be generated manually or may be generated with any proper mask prediction techniques. The camera intrinsic may include a property of the camera, such as a focal length, an aperture, or a depth of field, etc. The camera extrinsic may include a position of a camera center and camera's heading in world coordinates (e.g., obtained based on a rotation matrix used to transform from 3D world coordinates to 3D camera coordinates, and position of an origin of world coordinate system expressed in coordinates of camera-centered coordinate system), a surrounding environment of the camera, or a distance between the camera and the object, etc.

At S204, the 2D pixel coordinate is projected to a 3D space to obtain a plurality of 3D points on the ray. In some embodiments, all or some of the plurality of 2D pixels of the 2D image may be projected to the same 3D space according to the rays corresponding to the 2D pixels.

As shown in FIG. 3, given 2D a sampled pixel coordinate o(u, v), the sampled pixel is projected to 3D space 304 to get the sampled 3D points on the ray. The 3D points projected on the ray can be denoted as:

$$\{p(t)=o+tv|t\geq 0\} \quad (1)$$

where v is the unit direction vector of the ray, and t is a coefficient to represent a location of the 3D point on the ray corresponding to the 2D pixel, where t can be any positive real number. Hereinafter, a projected 3D point may also be referred to as a 3D voxel, and may be denoted as p(t), p($t_i$), or simply p.

At S206, for each 3D point of the plurality of 3D points, a signed distance value for the 3D point is predicted. The signed distance value of the 3D point indicates a signed distance from the 3D point to a mesh surface. In some embodiments, the mesh surface may consist of a set of polygonal faces, such as triangles, that, taken together, form a surface covering of the object.

In some embodiments, given a 3D point $p \in R^3$, the signed distance function (SDF) $f(p): R^3 \to R$ represents the signed distance from the 3D point p to the mesh surface. Because there does not exist a clearly defined inside or outside, the direction is a "pseudo" direction, which may be defined locally.

In some embodiments, the signed distance value for the 3D point is predicted using a 3D reconstruction network. The 3D reconstruction network may include a signed distance function (SDF) neural model, for example, an SDF-Net 306. The SDF-Net includes a mapping function $f(p): R^3 \to R$ to represent the signed distance field. The signed distance value $\{f(p(t)) \in R | t \geq 0\}$ of the 3D point $\{p(t)=o+tv|t\geq 0\}$ can be predicted by evaluating the SDF-Net. In some embodiments, the SDF-Net for a set $\Omega$ of a volume of space may determine the distance of a given point x from the boundary of Ω, with the sign determined by whether x is in Ω. The volume of space may indicate a volume occupied by an object of interest in the 3D space. The SDF-Net may determine positive values for the signed distance values of points x inside Ω. The SDF-Net may decrease the signed distance value as x approaches the boundary of where the signed distance value is zero. The SDF-Net may determine negative values for the signed distance values of points x outside of Ω. In some embodiments, the SDF-Net may determine negative values for the signed distance values of the points x inside Ω, and determine positive values for the signed distance values of the points x outside Ω, where the inside and/or outside are defined locally.

At S208, a validity probability for the 3D point is predicted. The validity probability of the 3D point indicates a probability that the 3D point has a valid signed distance value.

Figure 4:
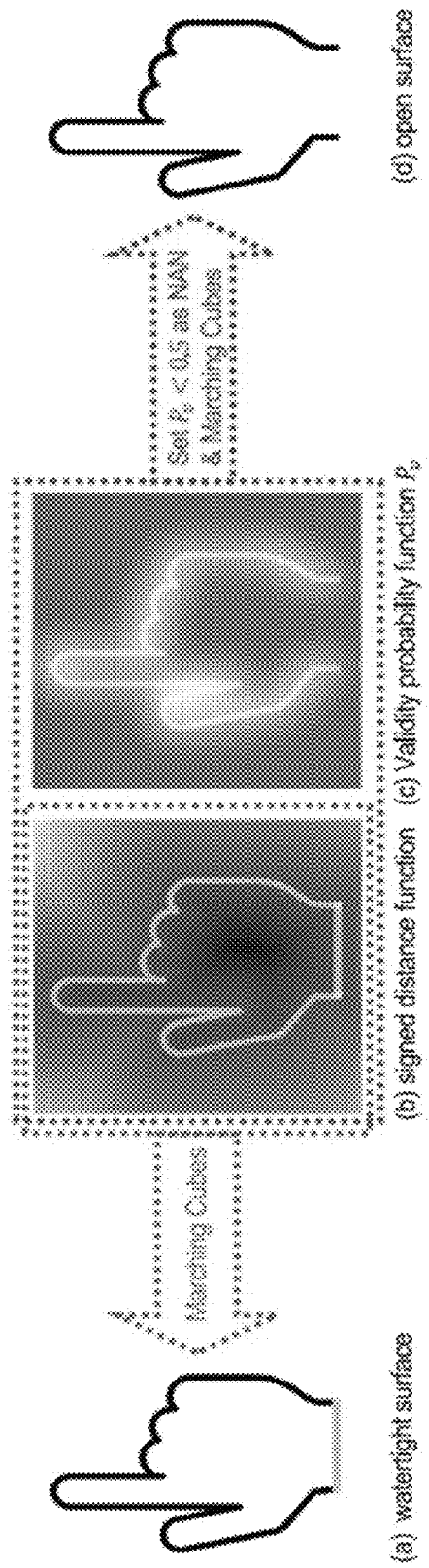
FIG. 4 illustrates surface representation according to some embodiments of the present disclosure.

FIG. 4 illustrates surface representation according to some embodiments of the present disclosure. As shown in FIG. 4, in some embodiments, a watertight 3D shape can be implicitly represented by a signed distance function (SDF). A watertight surface or a watertight shape is a closed surface or a closed shape. A closed surface is a surface that does not possess an edge or boundary. For example, a closed surface may include a sphere, a torus, and a Klein bottle. Existing techniques based on Signed Distance Function (SDF) are limited to watertight shapes. As shown on the left side of FIG. 4, a closed surface can be extracted from the SDF with the Marching Cubes algorithm. The present disclosure provides embodiments that can reconstruct 3D surfaces with arbitrary topologies including both watertight surfaces and open surfaces according to a combination of the signed distance function and a validity probability function, as shown on the right side of FIG. 4.

In some embodiments, given a 3D point $p \in R^3$, a validity probability function $P_v(p): R^3 \rightarrow R$ represents the probability that the 3D point has a valid signed distance value.

In some embodiments, in response to the predicted validity probability of one of the plurality of 3D points being less than a preset threshold, assigning an invalid value to the predicted signed distance value of the one of the plurality of 3D points. The preset threshold may be 0.5, 0.6, 0.7, 0.8, or 0.9, etc. The preset threshold may be any proper value between 0 and 1.

As shown in FIG. 4, by taking validity probability function into consideration, additional information that the bottom line in the watertight surface is invalid is obtained. By setting the signed distance value as an invalid value, for example, an NAN, when $P_v(p)<0.5$, an open surface as shown on the right side of FIG. 4 can be extracted with the Marching Cubes algorithm. That is, the validity probability function acts as a surface eliminator. An open surface is a surface with an edge, a rim, or a boundary. An open surface or a non-closed surface may include, for example, an open disk that is a sphere with a puncture, a cylinder that is a sphere with two punctures, and a Mobius strip.

In some embodiments, the validity probability for the 3D point is predicted using the 3D reconstruction network. The 3D reconstruction network may include a validity probability neural model, for example, a Validity-Net 308. The Validity-Net is a mapping function $P_v(p): R^3 \rightarrow R$ to represent the validity probability. The validity probability $\{P_v(p(t)) \in R | t \geq 0, 0 \leq P_v \leq 1\}$ of the 3D point $\{p(t)=o+tv | t \geq 0\}$ can be predicted by evaluating the Validity-Net. The validity probability can be inferred by rendering the object to 2D. In the rendering process, the validity probability is used to calculate the rendering weight and used to calculate the color value and the mask value. By applying back-propagation, the Validity-Net can be optimized to determine the validity probability value of each 3D point. In some embodiments, the Validity-Net 308 is a neural network with a plurality of layers. In a first iteration, for a 3D point, an initial validity probability is assigned to the 3D point randomly. For example, the initial validity probability of the one or more 3D points is 0.5. The Validity-Net 308 may be updated after each iteration to obtain updated validity probabilities of certain 3D points.

In some embodiments, a rendering weight for the 3D point is calculated based on the predicted signed distance value and the predicted validity probability of the 3D point.

In some embodiments, predicting the rendering weight for the 3D point may include determining a probability density function to map the predicted signed distance value of the 3D point to a volume density, determining a volume weight function based on the volume density and the validity probability of the 3D point, and determining the rendering weight for the 3D point based on the volume weight function.

In watertight surface reconstruction, the 3D points lying in the range over which the camera ray is exiting the surface from inside to outside are ignored in the rendering process. In volume rendering, the volume weights are set to zero. In surface rendering, the points are ignored. This operation will not lead to miss-rendered pixels because the renderer has already rendered the surface when the ray entered the surface from outside to inside.

For open surfaces, the inside or outside may not be able to be clearly defined. A ray can directly exit the surface from the "pseudo" inside to the "pseudo" outside without entering the "pseudo" inside. To render all the surfaces, each valid surface point is rendered if the ray enters the surface from the "pseudo" outside to the "pseudo" inside, and each valid surface point is rendered if the ray exits the surface from the "pseudo" inside to the "pseudo" outside.

To apply a volume rendering method for reconstruction, a probability density function that maps the signed distance field (SDF) to a volume density may be selected. In some embodiments, the rendering behaves the same when the ray enters the surface from the "pseudo" outside to the "pseudo" inside and when the ray exits the surface from the "pseudo" inside to the "pseudo" outside.

In some embodiments, determining the probability density function to map the predicted signed distance value of the 3D point to the volume density includes determining the probability density function based on a sigmoid mapping function, the predicted signed distance value, and a sign adjustment function. The sign adjustment function is configured to change the predicted signed distance value of the 3D point from the predicted signed distance value in a first direction to a predicted signed distance value in a second direction, where the first direction is opposite to the second direction. For example, the predicted signed distance value is a negative value, which indicates that the first direction of the predicted signed distance is from inside to outside a boundary. The signed adjustment function is used to change the predicted signed distance value to a positive value, which indicates an opposite direction of the first direction.

In some embodiments, the sign adjustment function may be defined as follows:

$$\gamma(p(t_i))=-\text{Sign}(\cos(v,n(p(t_i)))) \quad (2)$$

where v is the unit direction vector of the ray and n is the normal (gradient) vector of the signed distance. In some embodiments, $\gamma(p(t_i))$ is either −1 or +1.

When the ray enters the surface from the "pseudo" outside to the "pseudo" inside, the ray and the normal points towards different directions:

$$n(p(t)) \cdot v < 0 \Rightarrow \gamma(p) = -\text{Sign}(\cos(v, n(p(t)))) > 0 \quad (3)$$

When the ray exits the surface from the "pseudo" inside to the "pseudo" outside, the ray and the normal points towards the same directions:

$$n(p(t)) \cdot v > 0 \Rightarrow \gamma(p) = -\text{Sign}(\cos(v, n(p(t)))) < 0 \quad (4)$$

For any 3D points $p(t_1)$, $p(t_2)$ with opposite normal directions and $f(p(t_1)) = -f(p(t_2))$:

$$\begin{cases} \Phi_s(f(p(t_1))) \cdot \gamma((p(t_1))) = \Phi_s(f(p(t_2))) \cdot \gamma(p(t_2)) \\ \phi_s(f(p(t_1))) \cdot \gamma((p(t_1))) = \phi_s(f(p(t_2))) \cdot \gamma(p(t_2)) \end{cases} \quad (5)$$

The rendering behaves the same when ray enters the surface from the "pseudo" outside to the "pseudo" inside and when the ray exits the surface from the "pseudo" inside to the "pseudo" outside. The mapping function $\phi_s(f(p) \cdot \gamma(p))$ that maps from the signed distance field to the probability density field may be a sigmoid mapping function.

In some embodiments, the mapping function $\Phi_s(x)$ can be the integral of any unimodal (i.e., bell-shaped) density distribution centered at 0.

In some embodiments, a weight function 312 denoted as $w(t)$ on the ray may be defined based on the signed distance field (SDF) of the scene. In some embodiments, the weight function may satisfy at least one an unbiased requirement or an occlusion-aware requirement. In some embodiments, the weight function may satisfy both the unbiased requirement and the occlusion-aware requirement.

To satisfy the unbiased requirement of the weight function, an unbiased weight function is constructed as follows:

$$w(t) = \frac{\phi_s(f(p(t))) \cdot \gamma(p(t))}{\int_{-\infty}^{+\infty} \phi_s(f(p(t))) \cdot \gamma(p(t))} dt \quad (6)$$

Equation (6) is naturally unbiased, but not occlusion aware. To satisfy both the occlusion-aware requirement and the first-order unbiased requirement of the weight function $w(t)$, an opaque density function $\rho(t)$ which is the counterpart of the volume density in the standard volume rendering formulation is defined. Then the weight can be calculated by:

$$w(t) = T(t)\rho(t) \quad (7)$$

where $T(t) = \exp(-\int_0^t \rho(u) du)$ is an accumulated transmittance along the ray.

In some embodiments, to derive the opaque density $\rho(t)$, a simple case where there is only one plane in the sampling space may be considered first. Then, $\rho(t)$ is generalized to a general case of multiple surface intersections.

In the simple case of a single plane, the signed distance function $f(p(t)) = \cos(\theta)(t - t^*)$, where $f(p(t^*)) = 0$, and $\theta$ is the angle between ray v and the surface normal n. Because the surface is assumed locally, $\cos(\theta)$ is a constant value. Because there is one single plane with a constant face orientation, $\gamma(p(t))$ is a constant value, denoted as $\gamma$. Then, $$w(t) = \frac{\phi(f(p(t)) \cdot \gamma(p(t)))}{\int_{-\infty}^{+\infty} \phi_s(f(p(u)) \cdot \gamma(p(u))) du} \quad (9)$$

$$= \frac{\phi_s(f(p(t)) \cdot \gamma)}{\int_{-\infty}^{+\infty} \phi_s(\cos(\theta) \cdot \gamma(u - t^*)) du}$$

$$= \frac{\phi_s(f(p(t)) \cdot \gamma)}{(\cos(\theta) \cdot \gamma)^{-1} \int_{-\infty}^{+\infty} \phi_s(u - t^*) du}$$

$$= \cos(\theta) \cdot \gamma \cdot \phi_s(f(p(t)) \cdot \gamma)$$

$$= \frac{d}{dt} f(p(t)) \cdot \gamma \cdot \phi_s(f(p(t)) \cdot \gamma)$$

$$= \frac{d}{dt} \Phi_s(f(p(t)) \cdot \gamma)$$

In addition, Equation (10) can be inferred from the weight function defined in Equation (7).

$$w(t) = T(t)\rho(t) = \frac{dT}{dt}(t) \quad (10)$$

Equation (11) can be obtained by combining Equation (9) and Equation (10):

$$\frac{dT}{dt}(t) = \frac{d}{dt} \Phi_s(\gamma f(p(t))) \quad (11)$$

Equation (12) can be obtained by integrating both sides of Equation (11):

$$T(t) = \Phi_s(\gamma f(p(t))) \quad (12)$$

Taking the logarithm and then differentiating both sides of Equation (12), Equation (13) can be obtained as follows:

$$\int_\infty^t \rho(u) du = -\ln(\Phi_s(f(p(t)) \cdot \gamma)) \Rightarrow \rho(t) = \frac{\frac{d\Phi_s}{dt}(f(p(t)) \cdot \gamma)}{\Phi_s(f(p(t)) \cdot \gamma)} \quad (13)$$

In some embodiments, for a general case of multiple surface intersections, the weight function can be expressed as follows:

$$w(t) = T(t)\rho(t) \quad (14)$$

$$= \exp\left(-\int_0^t \rho(t') dt'\right) \rho(t)$$

$$= \exp\left(-\int_0^{t_l} \exp\left(-\int_{t_l}^t \rho(t') dt'\right)\right) \rho(t)$$

$$= T(t_l) \exp\left(-\int_{t_l}^t \rho(t') dt'\right) \rho(t)$$

$$= T(t_l) \exp(-(-\ln(\Phi_s(f(p(t)))) + \ln(\Phi_s(f(p(t_l))))))\rho(t)$$

$$= T(t_l) \frac{\Phi_s(f(p(t))\gamma(p(t)))}{\Phi_s(f(p(t_l))\gamma(p(t_l)))} \frac{\frac{d}{dt}\Phi_s(f(p(t))\gamma(p(t)))}{\Phi_s(f(p(t))\gamma(p(t)))}$$

$$= T(t_l) \frac{\phi_s(f(p(t))\gamma(p(t)))\gamma(p(t))\frac{d}{dt}f(p(t))}{\Phi_s(f(p(t_l))\gamma(p(t_l)))}$$

-continued $$= \frac{T(t_i)\gamma(p(t))\frac{d}{dt}f(p(t))}{\Phi_s(f(p(t_i))\gamma(p(t_i)))}\phi_s(f(p(t))\gamma(p(t)))$$

Supposing that the local surface is tangentially by a sufficiently small planar patch with its outward unit normal vector denoted as n. Then the signed distance function $f(p(t))$ can be expressed as:

$$f(p(t)) = \frac{d}{dt}f(p(t))\cdot v\cdot t + O(t^2) \quad (15)$$

Equation (16) can be inferred from Equation (15) as follows:

$$f(p(t))=n\cdot v\cdot t+O(t_2) \quad (16)$$

Then, Equation (14) can be rewritten as $$w(t) = \frac{T(t_i)\gamma(p(t))n\cdot v}{\Phi_s(f(p(t_i))\gamma(p(t_i)))}\phi_s(f(p(t))\gamma(p(t))) \quad (17)$$

where, $$\frac{T(t_i)\gamma(p(t))n\cdot v}{\Phi_s(f(p(t_i))\gamma(p(t_i)))}$$

can be considered as a constant. Hence, w(t) attains a local maximum when $f(p(t))=0$ because $\varphi_s(x)$ is a unimodal density function attaining the maximum value at x=0. Then, the opaque density function $\rho(t)$ can be obtained by:

$$\rho(t) = \frac{-\frac{d}{dt}\Phi_s(f(p(t)\gamma(p(t)))}{\Phi_s(f(p(t)\gamma(p(t)))} \quad (18)$$

The opaque density function can be a first-order unbiased and occlusion aware function.

In some embodiments, calculating the rendering weight for the 3D point based on the predicted signed distance value and the predicted validity probability of the 3D point includes calculating a discrete opacity value for the 3D point based on the predicted signed distance value and the predicted validity probability of the 3D point, and the predicted signed distance value and the predicted validity probability of one of the plurality of 3D points next to the 3D point on the ray.

A "pseudo" discrete opacity $\alpha_0(p(t_i))$ may be calculated as follows:

$$\alpha_0(p(t_i)) = \frac{\Phi_s(f(p(t_i))\cdot\gamma(p(t_i))) - \Phi_s(f(p(t_{i+1}))\cdot\gamma(p(t_{i+1})))}{\Phi_s(f(p(t_i))\cdot\gamma(p(t_i)))} \quad (19)$$

The "pseudo" discrete opacity $\alpha_0(p(t_i))$ may be disabled if $p(t_i)$ is predicted to be an invalid rendering point.

In some embodiments, the discrete opacity may be calculated based on a product of the "pseudo" discrete opacity value $\alpha_0(p(t_i))$ and the validity $P_v(p(t_{i+1}))$ for each 3D point:

$$\alpha(p(t_i))=\alpha_0(p(t_i))\cdot P_v(p(t_{i+1})) \quad (20)$$

In some embodiments, a mask 314 may be predicted based on the plurality of rendering weights of the plurality of 3D points. The predicted mask could be inferred by accumulating the rendering weights:

$$\hat{M}(o, v) = \int_0^{+\infty} w(t)dt \quad (21)$$

At S210, an intensity value for the 3D point is predicted.

In some embodiments, the intensity value for the 3D point is predicted using the 3D reconstruction network. The 3D reconstruction network may include an intensity neural model, for example, a Color-Net 310. The Color-Net is a mapping function $\hat{C}(p): R^3 \rightarrow R$ to predict the per-point color of the 3D space. The intensity value $\{\hat{C}(p(t), v)\in R^3|t\geq 0, 0\leq \hat{C}\leq 1\}$ of the 3D point $\{p(t)=o+tv|t\geq 0\}$ can be predicted by evaluating the Color-Net.

In some embodiments, the intensity value of the 3D point may include an RGB value, which includes an intensity value of a red channel, an intensity value of a green channel, and an intensity value of a blue channel. In some embodiments, the intensity value of the 3D point may include one or more of the intensity value of channels in other color format such as CMYK, HEX, or grayscale. In some embodiments, the intensity value of the 3D point may be represented using other proper manners.

For a set of sampled points along the ray $\{p_i=o+t_iv |i=1, \ldots, n, t_i<t_{i+1}\}$, the rendered pixel color may be obtained as follows:

$$\hat{I}(o, v) = \sum_{i=1}^{n} w_i \hat{C}_i = \sum_{i=1}^{n} T_i\alpha_i\hat{C}_i \quad (22)$$

where $T_i$ is the discrete accumulated transmittances defined by $$T_i=\Pi_{j=1}^{i-1}(1-\alpha_j) \quad (23)$$

and $\alpha_j$ is the discrete opacity value.

In some embodiments, the predicted image could be calculated by accumulating the colors along the ray with the predicted weights as follows:

$$\hat{I}(o, v) = \int_0^{+\infty} w(t)\hat{C}(p(t), v)dt \quad (24)$$

At S212, a rendering loss is obtained based on the predicted signed distance values, the validity probabilities, and the intensity values of the plurality of 3D points to update the 3D reconstruction network.

In some embodiments, the coefficients of the 3D reconstruction network may be updated based on the rendering loss using a plurality of randomly sampled 3D points. In a single iteration of training or updating, the rendering loss may be calculated for some sample points in a single 2D image, all points in the single 2D image, or points in several 2D images together. In some embodiments, there are N images and each one contains W×H pixels, then a total number of pixels is N×W×H. In a single iteration of training or updating, some sample points are randomly selected from the N×W×H pixels. The 3D reconstruction network may include the signed distance function (SDF) neural model, the validity neural model, and the intensity neural model. In some embodiments, the rendering loss may be calculated based on one or more of the following different losses:

i) Color Loss: for the sampled pixels with coordinates {(u, v): u∈ [0, W), v∈ [0, H)}, with a valid mask value, a photo-consistency loss for the 2D sampled pixels is defined as:

$$L_{rgb} = \Sigma_{u \in U, v \in V} \|I(u,v) - \hat{I}(u,v)\| \cdot M(u,v) \quad (25)$$

where $\|\cdot\|$ is L1-loss. In some embodiments, the color loss can be RGB loss.

ii) Mask Loss: for the sampled pixels with coordinates (u, v): u∈ [0, W), v∈ [0, H), a mask cross-entropy loss for the points is defined as:

$$L_{mask} = -M(u,v) \cdot \log(\hat{M}(u,v)) - (1-M(u,v)) \cdot \log(1-\hat{M}(u,v)) \quad (26)$$

iii) Eikonal Loss: an Eikonal term is added on the sampled points to regularize the SDF as:

$$L_{eikonal} = \frac{1}{N} \Sigma_p \left( \left| \frac{\partial f(p)}{\partial p} \right| - 1 \right)^2 \quad (27)$$

iv) Rendering Probability Loss: to make the rendering probability to be 0 (with no surface) or 1 (with valid surface), a binary cross entropy of $P_r(\bullet)$ is added as an extra regularization:

$$L_{reg-p} = \frac{1}{N} \Sigma_p -P_r(p) \cdot \log(P_r(p)) - (1 - P_r(p)) \cdot \log(1 - P_r(p)) \quad (28)$$

v) Rendering Probability Regularization Loss: because the surface of objects is thin in the 3D space, the sample points with $P_r(\bullet)=1$ should be sparse. An extra regularization is added by averaging the $P_r(\bullet)$ for all the samples:

$$L_{sparse} = \frac{1}{N} \Sigma_p P_r(p) \quad (29)$$

In some embodiments, the 3D reconstruction network may be updated with or without image masks.

In some embodiments, the 3D reconstruction network may be implemented using either multiple perception layers or 1D convolutional layer(s).

At S214, a 3D model of the object is extracted based on the updated 3D reconstruction network.

In some embodiments, the 3D model includes a mathematical coordinate-based representation of any surface of the object in three dimensions, which includes edges, vertices, and polygons, etc.

In some embodiments, the reconstructed surface of the object can be extracted as a zero-level iso-surface of the SDF. The iso-surface is a surface that represents points of a constant value within a volume of space. The iso-surface can be directly extracted using the classic Marching Cubes (MC) algorithm. The existence of invalid signed distance value can prevent MC from extracting valid iso-surfaces at locations that contain no shapes. After the Marching Cubes computation, all the invalid vertices and faces generated by the null cubes can be removed. The remaining vertices and faces serve as the meshing result.

To evaluate the 3D reconstruction, the 3D model reconstructed by the 3D reconstruction network of the present disclosure was compared with the 3D model reconstructed using a 3D reconstruction method proposed by Wang et al. in "Neus: Learning neural implicit surfaces by volume rendering for multi-view reconstruction," NeurIPS (2021) (hereinafter, [Neus]).

Figure 5:
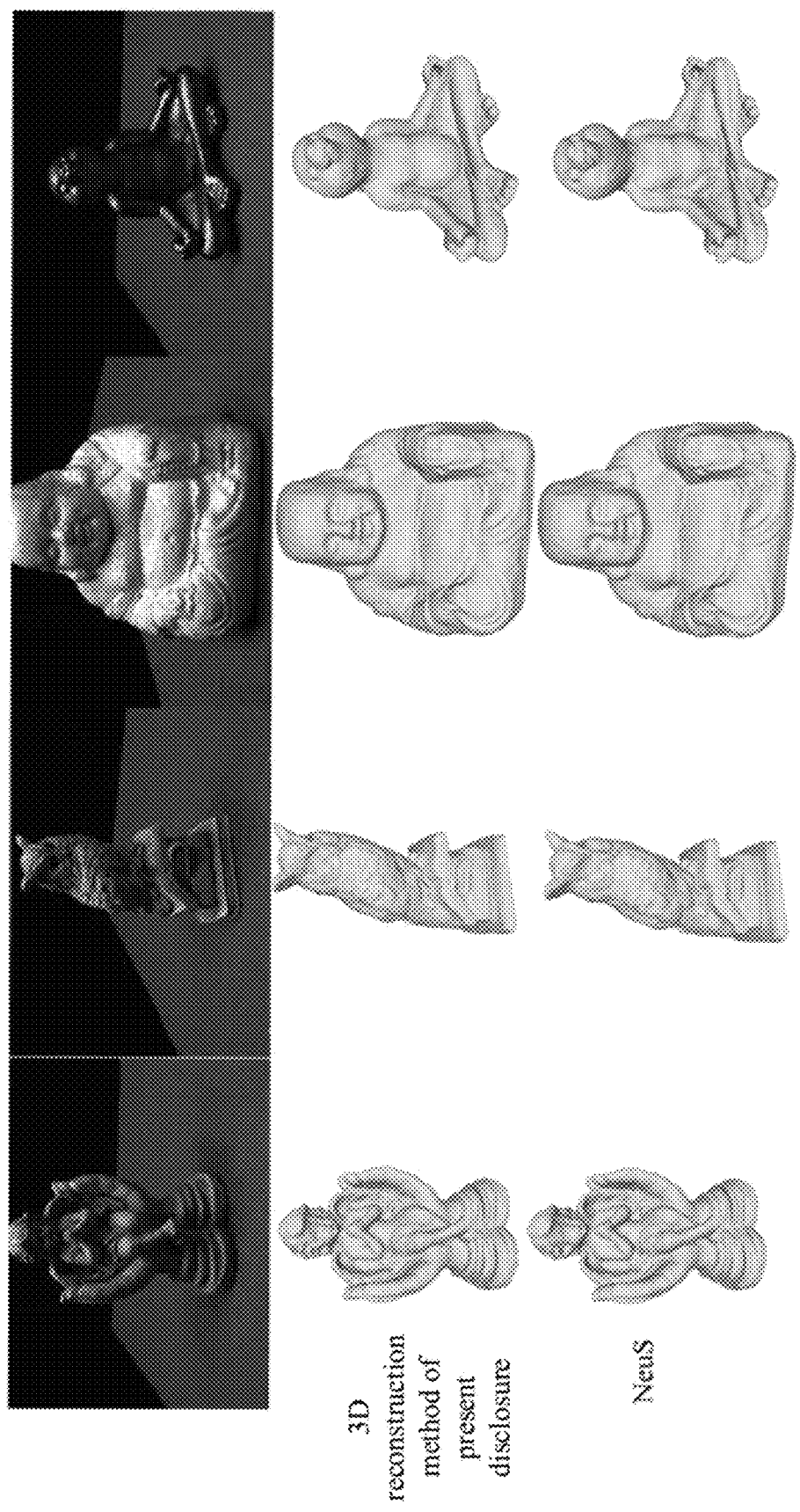
FIG. 5 illustrates a visual comparison for 3D reconstruction on watertight surfaces consistent with embodiments of the present disclosure.

FIG. 5 illustrates a visual comparison for 3D reconstruction on watertight surfaces consistent with embodiments of the present disclosure. As shown in FIG. 5, images of the objects for 3D reconstruction are shown in the first row. The second row of FIG. 5 shows the 3D models of the objects reconstructed using the 3D reconstruction method of the present disclosure. The third row of FIG. 5 shows the 3D models of the objects reconstructed using the 3D reconstruction method in Neus. Table 1 shows the quantitative comparisons on watertight surfaces data using the 3D reconstruction method of the present disclosure and the 3D reconstruction method in Neus, respectively. As shown in Table 1, for watertight surfaces, the 3D reconstruction method of the present disclosure generally provides lower numerical errors compared with the 3D reconstruction method in Neus.

TABLE 1

A comparison of general (symmetric) Hausdorff distance for 3D reconstruction on watertight surfaces.

| | 3D reconstruction method of the present disclosure | Neus |
| --- | --- | --- |
| dtu_scan105 | 356.076 | 355.140 |
| dtu_scan118 | 165.329 | 165.232 |
| dtu_scan122 | 177.317 | 178.871 |
| dtu_scan65 | 261.829 | 261.428 |
| dtu_scan106 | 175.803 | 177.691 |
| dtu_scan110 | 161.084 | 167.054 |
| dtu_scan114 | 144.942 | 144.481 |

Figure 6:
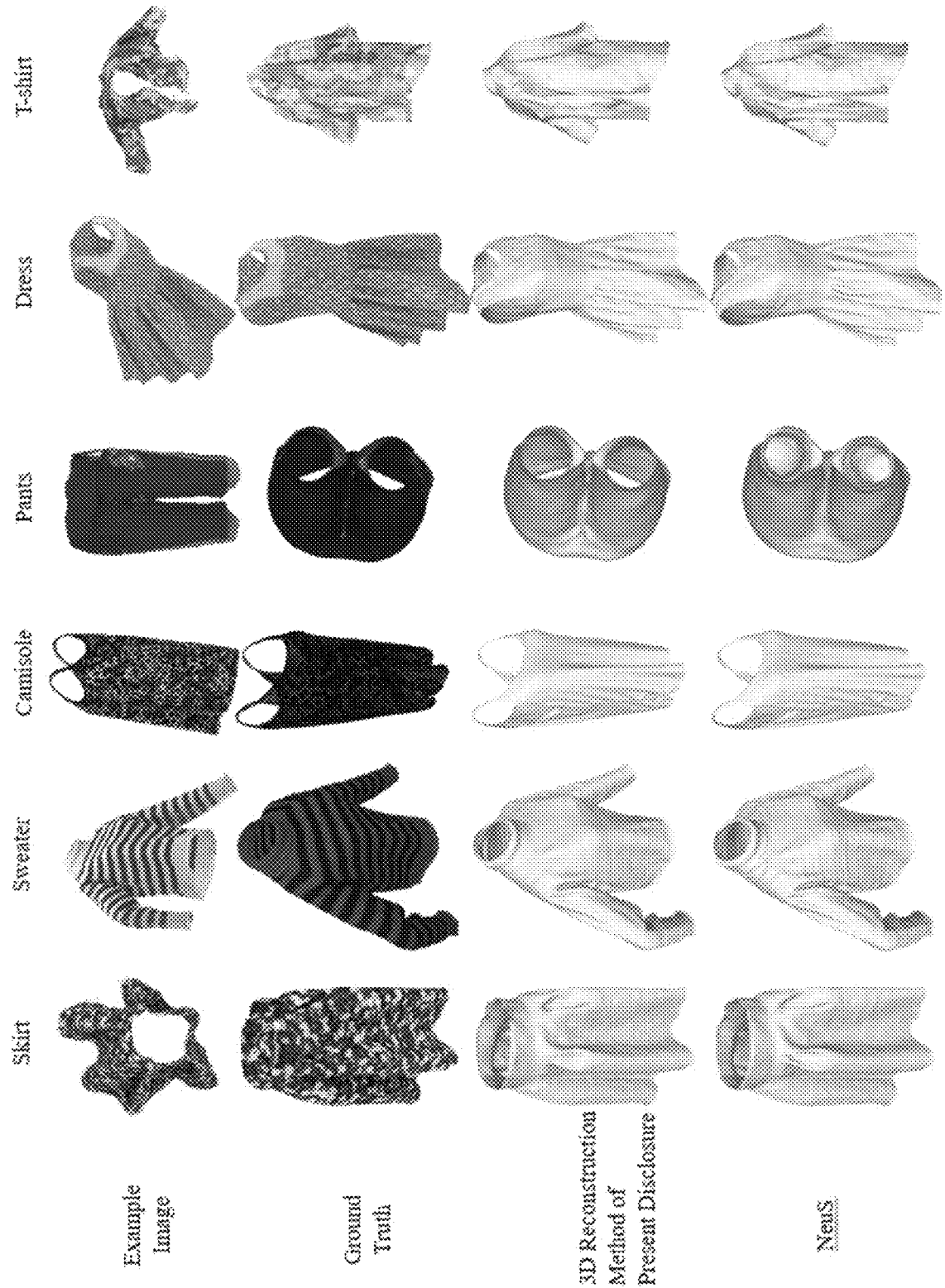
FIG. 6 illustrates a visual comparison for 3D reconstruction on open surfaces consistent with certain embodiments of the present disclosure.

FIG. 6 illustrates a visual comparison for 3D reconstruction on open surfaces consistent with certain embodiments of the present disclosure, where the front faces are highlighted in blue and the back faces are highlighted in pink. As shown in FIG. 6, images of the objects for 3D reconstruction are shown in the first row. The ground truths of the objects are shown in the second row of FIG. 6. The third row of FIG. 6 shows the 3D models of the objects reconstructed using the 3D reconstruction method of the present disclosure, and the fourth row of FIG. 6 shows the 3D models of the objects reconstructed using the 3D reconstruction method in Neus. As shown in FIG. 6, the 3D reconstruction method of the present disclosure reconstruct high-fidelity single-layer surfaces while the existing technology reconstructs double-layer surfaces.

Table 2 shows the quantitative comparisons on open surfaces data using the 3D reconstruction method of the present disclosure and the 3D reconstruction method in Neus, respectively. As shown in Table 2, for open surfaces, the 3D reconstruction method of the present disclosure provides lower numerical errors compared with an existing technology.

TABLE 2

A comparison of Chamfer Distance
for 3D reconstruction on open surfaces.

| Chamfer Distance ($\times 10^{-3}$) | Skirt | Sweater | Camisole | Pants | Dress | T-shirt |
|---|---|---|---|---|---|---|
| 3D reconstruction method of the present disclosure | 2.9715 | 5.2634 | 2.4959 | 14.2248 | 3.6122 | 4.7824 |
| Neus | 4.7022 | 6.2924 | 4.7854 | 23.5869 | 5.2693 | 5.4541 |

Existing techniques based on Signed Distance Function (SDF) are limited to watertight shapes. The present disclosure provides embodiments that can reconstruct 3D surfaces with arbitrary topologies including both watertight surfaces and open surfaces according to a combination of the signed distance function and a validity probability function.

The sequence numbers of the foregoing embodiments of the present disclosure are merely for description purpose and do not indicate the preference of the embodiments.

When the integrated unit in the foregoing embodiments is implemented in the form of a software functional unit and sold or used as an independent product, the integrated unit may be stored in the foregoing computer-readable storage medium. Based on such an understanding, the technical solution of the present disclosure essentially, or a part contributing to the related art, or all or a part of the technical solution may be implemented in a form of a software product. The computer software product is stored in a storage medium and includes several instructions for instructing one or more computer devices (which may be a personal computer, a server, a network device, or the like) to perform all or some of steps of the methods in the embodiments of the present disclosure.

In the foregoing embodiments of the present disclosure, descriptions of the embodiments have different emphases. As for parts that are not described in detail in one embodiment, reference can be made to the relevant descriptions of the other embodiments.

In the several embodiments provided in the present disclosure, it is to be understood that the disclosed client can be implemented in other manners. The apparatus embodiments described above are merely exemplary. For example, the division of the units is merely the division of logic functions and can use other division manners during actual implementation. For example, a plurality of units or components can be combined, or can be integrated into another system, or some features can be omitted or not performed. In addition, the coupling, or direct coupling, or communication connection between the displayed or discussed components can be the indirect coupling or communication connection through some interfaces, units, or modules, and can be in electrical or other forms.

The units described as separate parts can or cannot be physically separate. Parts displayed as units can or cannot be physical units, and can be located in one position, or can be distributed on a plurality of network units. Some or all of the units can be selected according to actual requirements to achieve the objectives of the solutions in the embodiments.

In addition, functional units in the embodiments of the present disclosure can be integrated into one processing unit, or each of the units can exist alone physically, or two or more units are integrated into one unit. The foregoing integrated unit can be implemented in the form of hardware or can be implemented in the form of a software function unit.

Although the principles and implementations of the present disclosure are described by using specific embodiments in the specification, the foregoing descriptions of the embodiments are only intended to help understand the method and core idea of the method of the present disclosure. Meanwhile, a person of ordinary skill in the art may make modifications to the specific implementations and application range according to the idea of the present disclosure. In conclusion, the content of the specification should not be construed as a limitation to the present disclosure.

What is claimed is:

1. A three-dimensional (3D) reconstruction method comprising:
   obtaining a two-dimensional (2D) pixel coordinate of a pixel in a 2D image of an object and a direction of a ray;
   projecting the 2D pixel coordinate to a 3D space to obtain a plurality of 3D points on the ray;
   updating a 3D reconstruction network in a plurality of iterations, in one iteration:
      for each single 3D point of the plurality of 3D points:
         predicting a signed distance value for the 3D point, the signed distance value of the 3D point indicating a signed distance from the 3D point to a mesh surface;
         predicting a validity probability for the 3D point, the validity probability of the 3D point being a probability that the 3D point has a valid signed distance value, the probability that the 3D point has the valid signed distance value being a number ranging from 0 to 1 and reflecting a likelihood that the 3D point would have the valid signed distance value, the validity probability for the 3D point in a first iteration being a first value, and the validity probability for the 3D point being updated to a second value after one iteration, the second value being different from the first value; and
         predicting an intensity value for the 3D point; and
      obtaining a rendering loss based on the predicted signed distance values, the validity probabilities, and the intensity values of the plurality of 3D points to update the 3D reconstruction network; and
   extracting a 3D model of the object based on the updated 3D reconstruction network after the plurality of iterations.

2. The method of claim 1, wherein extracting the 3D model of the object based on the updated 3D reconstruction network includes:
   in response to the predicted validity probability of one of the plurality of 3D points being less than a preset threshold, assigning an invalid value to the predicted signed distance value of the one of the plurality of 3D points; and
   extracting the 3D model of the object by removing a vertex with the invalid signed distance value.

3. The method of claim 1, further comprising:
   for one 3D point of the plurality of 3D points, calculating a rendering weight for the 3D point based on the predicted signed distance value and the predicted validity probability of the 3D point.

4. The method of claim 3, wherein calculating the rendering weight for the 3D point based on the predicted signed distance value and the predicted validity probability of the 3D point includes:

determining a probability density function to map the predicted signed distance value of the 3D point to a volume density;

determining a volume weight function based on the volume density and the validity probability of the 3D point; and determining the rendering weight for the 3D point based on the volume weight function.

5. The method of claim 4, wherein determining the probability density function to map the predicted signed distance value of the 3D point to the volume density includes:

determining the probability density function based on a sigmoid mapping function, the predicted signed distance value, and a sign adjustment function, the sign adjustment function being configured to change the predicted signed distance value of the 3D point from the predicted signed distance value in a first direction to a predicted signed distance value in a second direction, the first direction being opposite to the second direction.

6. The method of claim 3, wherein calculating the rendering weight for the 3D point based on the predicted signed distance value and the predicted validity probability of the 3D point includes:

calculating a discrete opacity value for the 3D point based on the predicted signed distance value and the predicted validity probability of the 3D point, and the predicted signed distance value and the predicted validity probability of one of the plurality of 3D points next to the 3D point.

7. The method of claim 3, further comprising:

predicting a mask based on the plurality of rendering weights of the plurality of 3D points;

wherein obtaining the rendering loss based on the predicted signed distance values, the validity probabilities, and the intensity values of the plurality of 3D points to update the 3D reconstruction network includes:

obtaining the rendering loss based on the predicted mask to update the 3D reconstruction network.

8. The method of claim 7, wherein predicting the mask based on the plurality of rendering weights of the plurality of 3D points includes:

predicting the mask based on an accumulation of the plurality of rendering weights of the plurality of 3D points.

9. The method of claim 1, wherein obtaining the rendering loss based on the predicted signed distance values, the validity probabilities, and the intensity values of the plurality of 3D points to update the 3D reconstruction network includes:

calculating a rendering probability loss based on the validity probabilities of the plurality of 3D points and a binary cross entropy of the validity probabilities; and obtaining the rendering loss according to the rendering probability loss.

10. The method of claim 1, wherein obtaining the rendering loss based on the predicted signed distance values, the validity probabilities, and the intensity values of the plurality of 3D points to update the 3D reconstruction network includes:

calculating a rendering probability regularization loss based on an average of the validity probabilities of the plurality of 3D points; and obtaining the rendering loss according to the rendering probability regularization loss.

11. The method of claim 2, wherein the object includes an open surface, and the predicted validity probabilities of one or more 3D points correspond to the open surface are less than the preset threshold, the open surface being a surface with an edge, a rim, or a boundary.

12. The method of claim 1, further comprising:

in one iteration, for each 3D point of the plurality of 3D points, calculating a rendering weight for the 3D point based on the predicted signed distance value and the predicted validity probability of the 3D point including:

calculating a first discrete opacity value for the 3D point based on the predicted signed distance value of the 3D point and a predicted signed distance value of a neighboring 3D point of the plurality of 3D points next to the 3D point;

calculating a second discrete opacity value for the 3D point based on a product of the first discrete opacity value for the 3D point and a predicted validity probability of the neighboring 3D point; and calculating the rendering weight for the 3D point based on the second discrete opacity value for the 3D point.

13. A device for three-dimensional (3D) reconstruction comprising:

a memory storing a computer program; and a processor configure to execute the computer program to:

obtain a two-dimensional (2D) pixel coordinate of a pixel in a 2D image of an object and a direction of a ray;

project the 2D pixel coordinate to a 3D space to obtain a plurality of 3D points on the ray;

update a 3D reconstruction network in a plurality of iterations, in one iteration:

for each single 3D point of the plurality of 3D points:

predict a signed distance value for the 3D point, the signed distance value of the 3D point indicating a signed distance from the 3D point to a mesh surface;

predict a validity probability for the 3D point, the validity probability of the 3D point being a probability that the 3D point has a valid signed distance value, the probability that the 3D point has the valid signed distance value being a number ranging from 0 to 1 and reflecting a likelihood that the 3D point would have the valid signed distance value, the validity probability for the 3D point in a first iteration being a first value, and the validity probability for the 3D point being updated to a second value after one iteration, the second value being different from the first value; and predict an intensity value for the 3D point; and obtain a rendering loss based on the predicted signed distance values, the validity probabilities, and the intensity values of the plurality of 3D points to update the 3D reconstruction network; and extract a 3D model of the object based on the updated 3D reconstruction network after the plurality of iterations.

14. The device of claim 13, the processor is further configured to:

in response to the predicted validity probability of one of the plurality of 3D points being less than a preset threshold, assign an invalid value to the predicted signed distance value of the one of the plurality of 3D points; and extract the 3D model of the object by removing a vertex with the invalid signed distance value.

15. The device of claim 13, the processor is further configured to:
for one 3D point of the plurality of 3D points, calculate a rendering weight for the 3D point based on the predicted signed distance value and the predicted validity probability of the 3D point.

16. The device of claim 15, the processor is further configured to:
determine a probability density function to map the predicted signed distance value of the 3D point to a volume density;
determine a volume weight function based on the volume density and the validity probability of the 3D point; and
determine the rendering weight for the 3D point based on the volume weight function.

17. The device of claim 15, the processor is further configured to:
calculating a discrete opacity value for the 3D point based on the predicted signed distance value and the predicted validity probability of the 3D point, and the predicted signed distance value and the predicted validity probability of one of the plurality of 3D points next to the 3D point.

18. The device of claim 13, the processor is further configured to:
calculate a rendering probability loss based on the validity probabilities of the plurality of 3D points and a binary cross entropy of the validity probabilities; and
obtain the rendering loss according to the rendering probability loss.

19. The device of claim 13, the processor is further configured to:
calculate a rendering probability regularization loss based on an average of the validity probabilities of the plurality of 3D points; and
obtain the rendering loss according to the rendering probability regularization loss.

20. A non-transitory computer-readable storage medium storing computer instructions that, when executed by a processor, causing the processor to perform:
obtaining a two-dimensional (2D) pixel coordinate of a pixel in a 2D image of an object and a direction of a ray;
projecting the 2D pixel coordinate to a 3D space to obtain a plurality of 3D points on the ray;
updating a 3D reconstruction network in a plurality of iterations, in one iteration:
for each single 3D point of the plurality of 3D points:
predicting a signed distance value for the 3D point, the signed distance value of the 3D point indicating a signed distance from the 3D point to a mesh surface;
predicting a validity probability for the 3D point, the validity probability of the 3D point being a probability that the 3D point has a valid signed distance value, the probability that the 3D point has the valid signed distance value being a number ranging from 0 to 1 and reflecting a likelihood that the 3D point would have the valid signed distance value, the validity probability for the 3D point in a first iteration being a first value, and the validity probability for the 3D point being updated to a second value after one iteration, the second value being different from the first value; and
predicting an intensity value for the 3D point; and
obtaining a rendering loss based on the predicted signed distance values, the validity probabilities, and the intensity values of the plurality of 3D points to update the 3D reconstruction network; and
extracting a 3D model of the object based on the updated 3D reconstruction network after the plurality of iterations.

* * * * *